Patented June 28, 1932

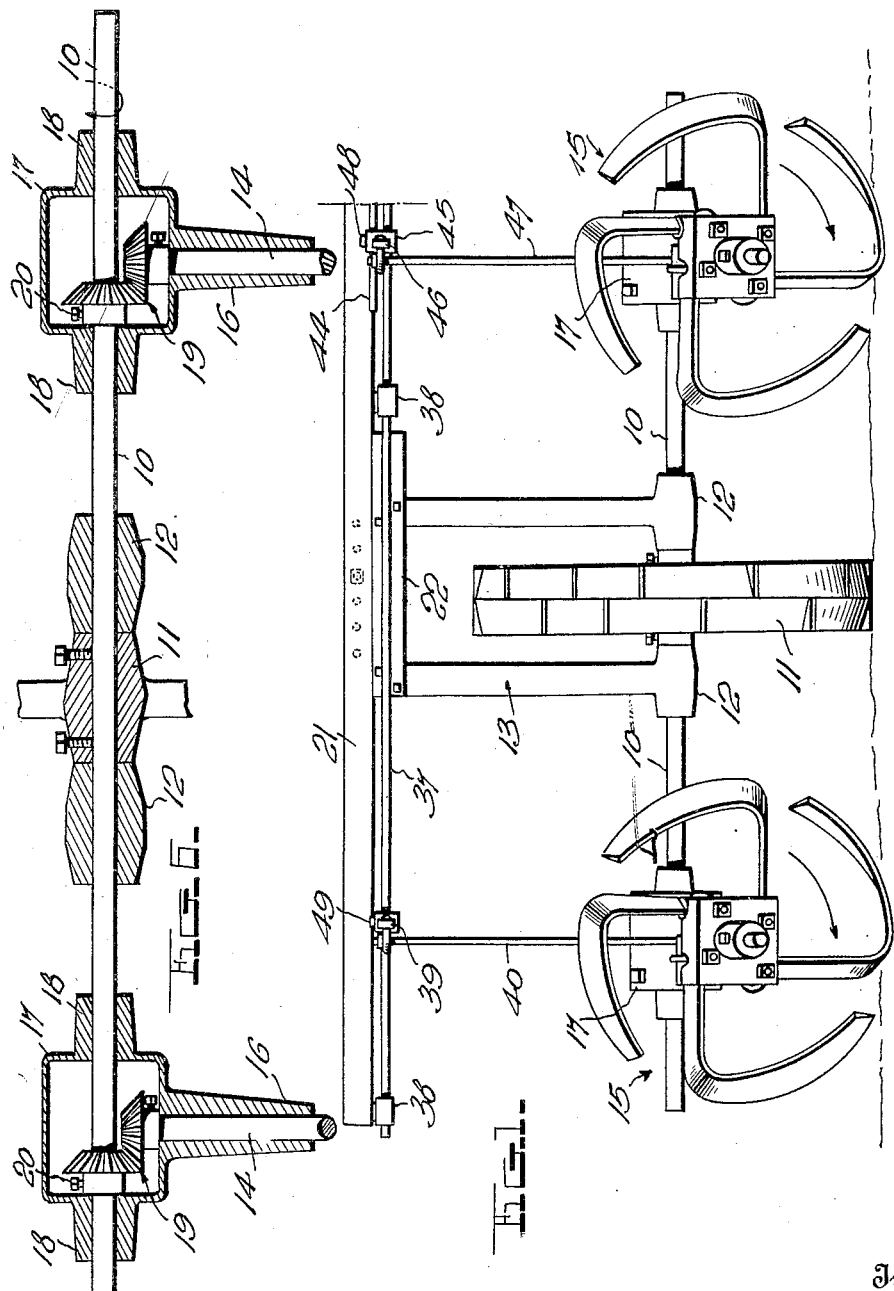

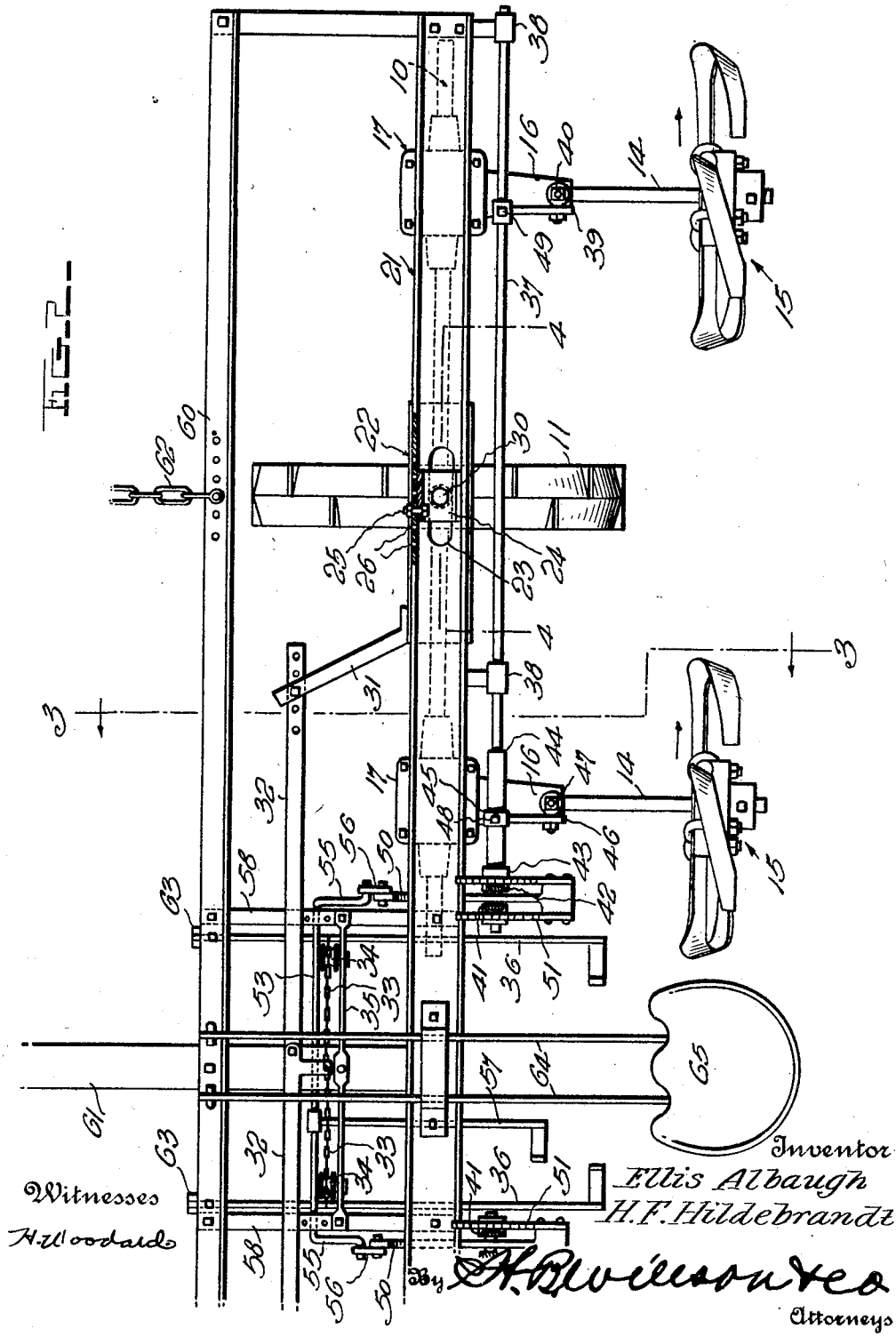

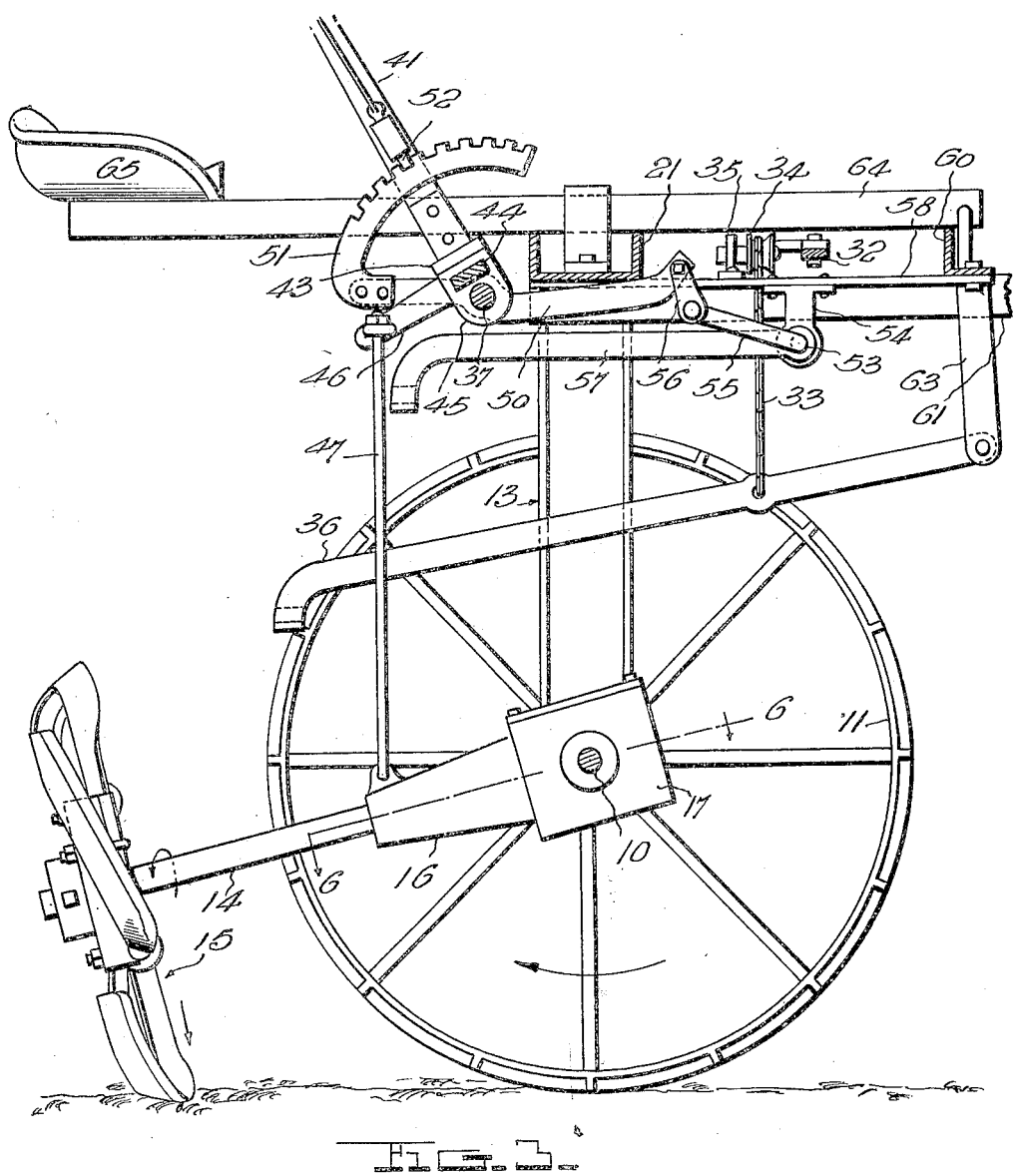

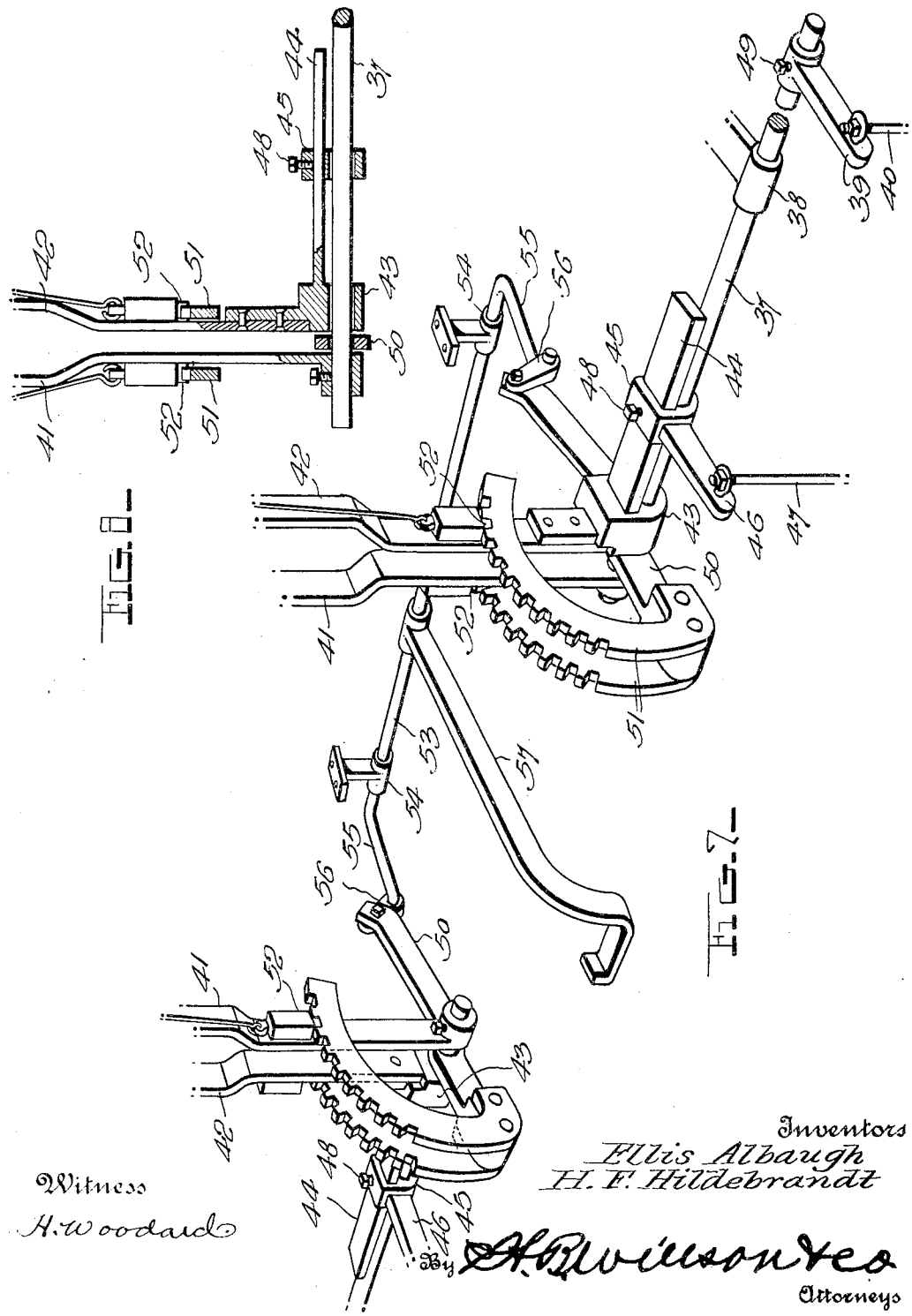

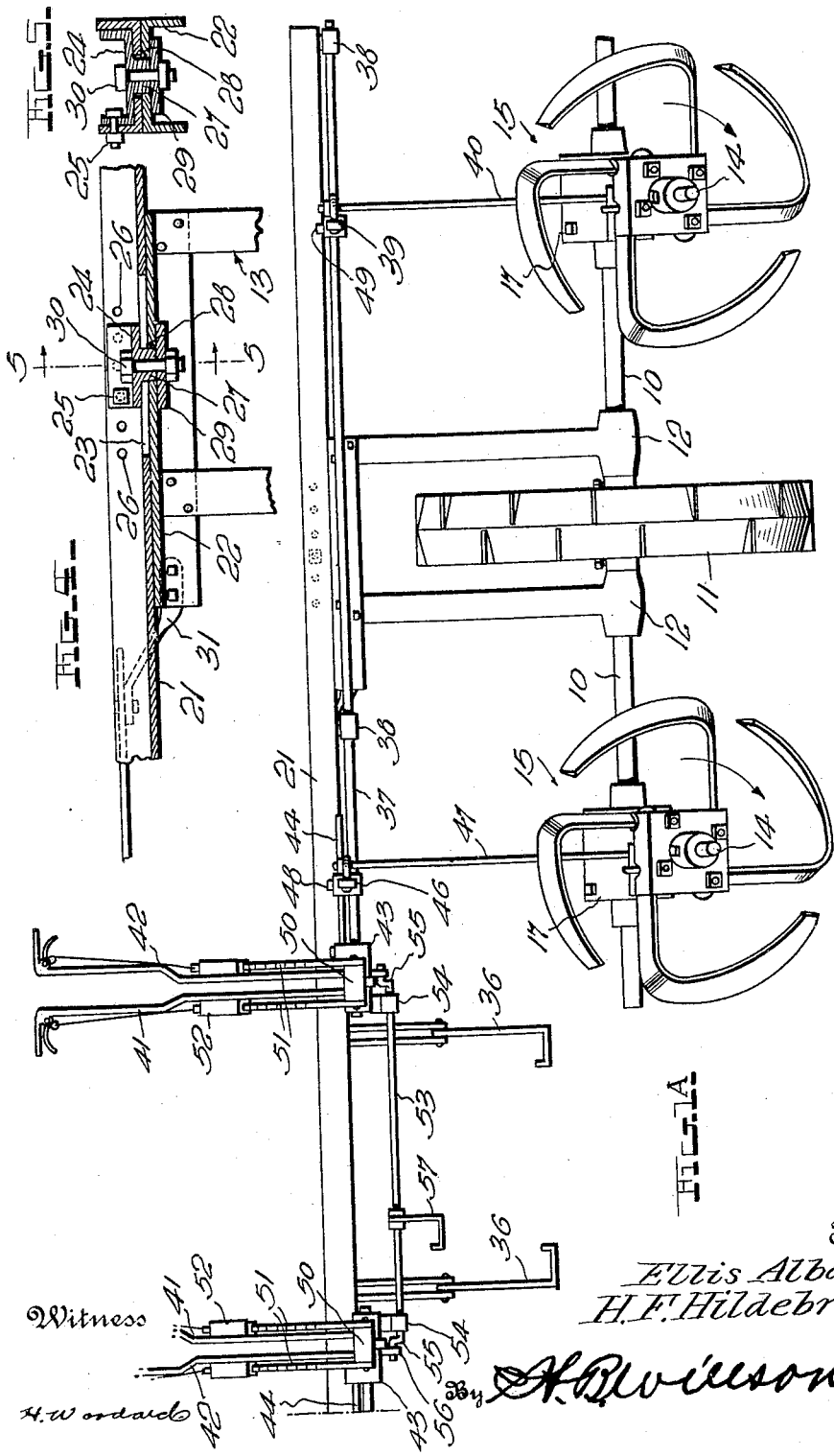

1,865,351

UNITED STATES PATENT OFFICE

ELLIS ALBAUGH AND HENRY F. HILDEBRANDT, OF SAN ANTONIO, TEXAS, ASSIGNORS TO DIXIE COTTON MACHINERY COMPANY, OF SAN ANTONIO, TEXAS, A CORPORATION OF DELAWARE

COTTON CHOPPING MACHINE

Application filed March 17, 1930. Serial No. 436,618.

The invention relates to a machine for chopping cotton and while a four-row machine has been disclosed, it is to be understood that novel features thereof can be embodied in machines for chopping any other desired number of rows. Moreover, although the machine herein illustrated is of a type to be tractor-drawn or horse-drawn, it will be clear that it might well be tractor-carried and tractor-driven.

It is the primary object of the invention to provide a rather simple and inexpensive machine which will be rapid and efficient, and may be easily controlled. In attaining this end, further aims are to provide a novel way of mounting and driving the chopping cutters, to provide novel steering means for maintaining relation of the cutters with the rows; to provide unique means whereby the cutters may be either individually raised or simultaneously raised; and to make novel provision for laterally adjusting the cutters according to the distance between the rows of cotton to be chopped.

With the foregoing and minor objects in view, the invention resides in the novel subject matter hereinafter described and claimed, description being accomplished by reference to the accompanying drawings.

Figs. 1 and 1ª jointly disclose a rear elevation.

Fig. 2 is a top plan view of the portion of the machine shown in Fig. 1ª.

Fig. 3 is a transverse vertical sectional view on line 3—3 of Fig. 2.

Fig. 4 is a detail vertical sectional view on line 4—4 of Fig. 2.

Fig. 5 is a vertical section on line 5—5 of Fig. 4.

Fig. 6 is a horizontal sectional view as indicated by line 6—6 of Fig. 3.

Fig. 7 is a perspective view illustrating the raising and lowering means for the cutters.

Fig. 8 is a vertical sectional view partly in elevation, of a number of the parts shown at the right of Fig. 7.

The construction herein illustrated may be considered as preferred, with the understanding that within the scope of the invention as claimed, numerous variations may be made.

The numerals 10 denote two transverse shafts provided with ground wheels 11 by which they are driven, said shafts being mounted in bearings 12 at the ends of arched frames 13, these frames being connected with a main frame in a manner to be hereinafter described. Extending rearwardly from the shafts 10, are cutter-carrying shafts 14 whose cutters 15 may be considered as of the type disclosed in U. S. application of Ellis Albaugh, Serial No. 436,619, filed March 17, 1930. The shafts 14 are rotatable in bearings 16 with which gear casings 17 are provided, these gear casings being also equipped with additional bearings 18 through which the shafts 10 pass. Within the gear casings 17, beveled gearing or the like 19 is disposed to establish driving connections between the shafts 10 and 14. The portions of the gearing 19 carried by the shafts 10, are preferably secured to the latter by set screws 20 (Fig. 6). By loosening these set screws, the gear casings 17 and the shafts 14 may be adjusted longitudinally of the shafts 10, after which, tightening of said set screws will secure the parts in adjusted position. Then too, the frames 13 may be adjusted toward or from each other to properly set the group of cutters at one side of the machine with respect to that at the other side, these adjustments and those of the gear casings 17 and shafts 14, being effected according to the distance between the rows of cotton to be chopped.

The main frame of the machine, embodies a channel bar 21 transverse to the path of the machine and resting on the crowns 22 of the arched cutter-carrying frames 13. As shown most clearly in Figs. 2, 4 and 5, a novel adjustable and pivotal connection is provided between the bars 21 and 22. Bar 21 is provided with a longitudinal slot 23 which is spanned by a slide plate 24, this slide plate being secured by a bolt 25 insertible through any of a plurality of bolt holes 26, in the bar 21. The slide plate 24 is provided with a downwardly projecting boss 27 passing through the slot 23 and through an opening 28 in the crown bar 22, and a washer 29 which underlies said crown bar, abuts the lower end of said boss 27 and is held in place by a vertical bolt 30. This construction provides a vertical-axis pivotal connection between the frame 13 and the bar 21 and also allows adjustment of said frame 13 longitudinally of said bar. When making this adjustment, the bolt 25 is of course removed, said bolt being passed again through one of the openings 26 when the desired adjustment has been made.

Each crown bar 22 is provided with a forwardly projecting rigidly attached arm 31, the two arms at the opposite sides of the machine being connected by transverse linkage 32. Two chains 33 are connected with this linkage at a central point and extend oppositely outward from this point and over sheaves 34 which may well be mounted on a transverse bar 35. The lower ends of the chains 33 are secured to two foot levers 36 respectively, so that downward movement of one of these levers will operate the linkage 32 to turn the frames 13 in one direction, while depression of the other lever will actuate said linkage to turn said frames in the other direction. Thus, in a machine equipped with ground wheels as shown, steering may be readily effected to cause the cutters 15 to properly engage the cotton rows. In a tractor-carried and tractor-driven machine, while actual steering of the latter would not be effected by actuation of the foot levers 36, the shafts 14 would nevertheless be swung in one direction or the other by operation of said foot levers, and consequently the cutters 15 could be guided along the rows.

For raising and lowering the cutters, two groups of parts are provided at opposite sides of the machine, one group and a portion of the other group being shown in Figs. 1ᵃ, 2 and 7. As both of these groups are identical with the exception that they are rights and lefts, a description of one will suffice for both. 37 denotes a rock shaft behind the bar 21 and mounted in appropriate bearings 38 carried by said bar 21, said rock shaft being provided with a rearwardly projecting arm 39 connected by a link 40 with the bearing 16 of one of the gear boxes 17, said arm 39 being at the outer end of the shaft 37, while the inner end of the latter is provided with an upstanding operating lever 41. A second lever 42 is provided at its lower end with a bearing 43 which is provided at its lower end with a bearing 43 which is loose upon the shaft 37, said bearing 43 being provided with a rigidly attached arm-like projection 44 extending along the shaft 37. Slidable along this projection 44 and preferably along the shaft 37 also, is a bearing 45 carrying an arm 46, the latter being connected by a link 47 with the bearing 16 of the inner gear box 17. A set screw 48 is shown for clamping the bearing 45 in set position, and a similar screw 49 is provided for the arm 39. By loosening these screws the arms 39 and 46 may be relatively adjusted whenever it is necessary to similarly adjust the gear boxes 17.

A third lever 50 is loose on the shaft 37, being preferably interposed between the levers 41 and 42. Lever 50 is fulcrumed between its ends and is disposed horizontally, the rear end of said lever 50 being provided with toothed segments 51 co-acting with appropriate dogs 52 for locking the levers 41 and 42 in adjusting position.

Release of the dog 52 of the lever 42 permits operation of the latter to effect raising or lowering of the innermost cutter 15 at one side of the machine, without similarly moving any of the other cutters. Similarly, release of the dog 52 of the lever 41 allows movement of this lever to turn the rock shaft 37 for effecting vertical movement of the outermost cutter at one side of the machine, without similarly moving any of the other cutters. Thus, the two groups of parts being the same at opposite sides of the machine, the cutters may be easily adjusted vertically to obtain the best results, and when the dogs 52 are engaged with segments 51, the levers 41 and 42 at the opposite sides of the machine are virtually locked to the levers 50. Hence, swinging of these two levers 50 will effect simultaneous operation of all of the levers 41 and 42 for the purpose of raising or lowering all of the cutters whenever desired, for instance, to clear obstructions or when turning at the ends of the field.

Master operating means are provided for simultaneously moving the levers 50. In the present showing, a U-shaped rock shaft 53 is mounted in appropriate bearings 54, the arms 55 of said rock shaft being connected by links 56 with the front ends of the levers 50. The intermediate portion of the shaft 53 is provided with a rearwardly projecting foot lever 57. When all of the cutters are lowered, the levers 50 preferably lie against the lower side of the bar 21 as shown in Fig. 3, and hence the cutters 15 cannot penetrate the earth beyond a predetermined extent. By simply depressing the foot lever 57, the levers 50 are simultaneously swung from their normal positions, effecting operation of all of the levers 41 and 42 and the parts operated by these levers, for the purpose of simultaneously raising all of the cutters from engagement with the ground. When lever 57 is relieved of foot pressure, the cutters again lower by gravity.

Secured to and extending forwardly from the central portion of the bar 21, two bars 58 have been shown. Similar bars 59 are shown at the ends of the bar 21, and a relatively light angle iron bar 60 which is spaced forwardly from said bar 21, is secured to said bars 58 and 59. A tongue 61 is shown secured to the bars 21 and 60, and the latter has been illustrated as provided with appropriate means 62 for attaching whiffletrees thereto. The bar 35 above described for carrying the sheaves 34, may well be secured to the tongue 61 and the bars 58, and the front ends of the levers 36 are preferably mounted upon arms 63 which project downwardly from the bar 60. Carrying bars 64 for a seat 65 may be suitably secured to the bars 60 and 21.

It will be seen from the foregoing that rather simple, yet highly desirable provision has been made for carrying out the objects of the invention. The machine may readily be adjusted according to the distance between rows, may be easily steered by foot pressure to cause the cutters 15 to properly follow said rows, the cutters may be vertically adjusted as may be desired by hand, and whenever required, all of the cutters may be bodily raised, simply by depressing the foot lever 57.

What is claimed is:

1. In an agricultural machine, alined transverse driven shafts, a plurality of cutter-carrying shafts extending rearwardly from said transverse shafts, driving connections between said transverse shafts and said cutter-carrying shafts, bearing means receiving said transverse and cutter-carrying shafts for maintaining the angular relation thereof and allowing vertical swinging of said cutter-carrying shafts, auxiliary frames over said transverse shafts respectively and having bearings in which these shafts are mounted, a main frame to which said auxiliary frames are pivoted on vertical axes, means on said main frame for turning said auxiliary frames about their pivotal axes, and means for upwardly or downwardly swinging said cutter-carrying shafts.

2. In an agricultural machine, alined transverse driven shafts, a plurality of cutter-carrying shafts extending rearwardly from said transverse shafts, driving connections between said transverse shafts and said cutter-carrying shafts, bearing means receiving said transverse and cutter-carrying shafts for maintaining the angular relation thereof and allowing vertical swinging of said cutter-carrying shafts, auxiliary frames over said transverse shafts respectively and having bearings in which these shafts are mounted, a main frame, means for pivoting said auxiliary frames to said main frame and for effecting adjustment of said auxiliary frames toward and from each other, means on said main frame for turning said auxiliary frames about their pivotal axes, and means for upwardly or downwardly swinging said cutter-carrying shafts.

3. In an agricultural machine, alined transverse driven shafts, a plurality of cutter-carrying shafts extending rearwardly from said transverse shafts, driving connections between said transverse shafts and said cutter-carrying shafts, bearing means receiving said transverse and cutter-carrying shafts for maintaining the angular relation thereof and allowing vertical swinging of said cutter-carrying shafts, auxiliary frames over said transverse shafts respectively and having bearings in which these shafts are mounted, a main frame to which said auxiliary frames are pivoted on vertical axes, means on said main frame for turning said auxiliary frames about their axes, individual means on said main frame for upwardly or downwardly swinging said cutter-carrying shafts selectively, and master means for simultaneously operating all of said individual means when desired.

4. A structure as specified in claim 1; said transverse shafts having ground wheels by which they are driven.

5. In an agricultural machine, a transverse driven shaft, cutter-carrying shafts extending rearwardly from said transverse shaft, driving connections between the two shafts, bearing means receiving said shafts for maintaining the angular relation thereof and allowing upward and downward swinging of said cutter-carrying shaft, a frame having bearings for said transverse shaft, individual raising and lowering means mounted on said frame for effecting independent upward or downward swinging of said cutter-carrying shafts, and master raising and lowering means for simultaneously operating all of said individual raising and lowering means when desired.

6. In an agricultural machine, a transverse driven shaft, a cutter-carrying shaft extending rearwardly from said transverse shaft, driving connections between the two shafts, bearing means receiving said shafts for maintaining the angular relation thereof and allowing upward and downward swinging of said cutter-carrying shaft, a frame having bearings for said transverse shaft, and means for relatively moving the last named bearings to shift said transverse shaft to oblique positions.

7. In an agricultural machine, a transverse driven shaft, a cutter-carrying shaft extending rearwardly from said transverse shaft, driving connections between the two shafts, bearing means receiving said shafts for maintaining the angular relation thereof and allowing upward and downward swinging of said cutter-carrying shaft, an auxiliary frame having bearings in which said transverse shaft is mounted, a main frame to which said auxiliary frame is pivoted on a vertical axis, and means for turning said auxiliary frame about its pivotal axis.

8. In an agricultural machine, a transverse driven shaft, a cutter-carrying shaft extending rearwardly from said transverse shaft, driving connections between the two shafts, bearing means receiving said shafts for maintaining the angular relation thereof and allowing upward and downward swinging of said cutter-carrying shaft, an auxiliary frame having bearings in which said transverse shaft is mounted, a main frame to which said auxiliary frame is pivoted on a vertical axis, two oppositely movable foot levers mounted on said main frame, and connecting means between said foot levers and said auxiliary frame for turning the latter in either direction about its pivotal axis.

9. In an agricultural machine, a transverse driven shaft, a cutter-carrying shaft extending rearwardly from said transverse shaft, driving connections between the two shafts, bearing means receiving said shafts for maintaining the angular relation thereof and allowing upward and downward swinging of said cutter-carrying shaft, an auxiliary frame having bearings in which said transverse shaft is mounted, a main frame, a slide mounted on said main frame for movement transversely of the path of the machine, a vertical pivot connecting said auxiliary frame with said slide, means for normally holding said slide against sliding, and means for turning said auxiliary frame about said vertical pivot.

10. In an agricultural machine, a transverse driven shaft, a cutter-carrying shaft extending rearwardly from said transverse shaft, driving connections between the two shafts, bearing means receiving said shafts for maintaining the angular relation thereof and allowing upward and downward swinging of said cutter-carrying shaft, an arched frame having bearings at its ends in which said transverse shaft is mounted, a main frame having a bar disposed over the crown of said arched frame, said bar being disposed transversely of the path of the machine and having a longitudinal slot, a slide resting on said bar, a vertical pivot passing through said slot and connecting said slide with said crown of said arched frame, releasable means normally securing said slide to said bar, and means for turning said arched frame about said vertical pivot.

11. In an agricultural machine, a cutter-carrying frame, a main frame, means for pivoting said cutter-carrying frame to said main frame and for effecting adjustment of the frame transversely of the path of the machine, and means for swinging said cutter-carrying frame about its pivot.

12. In an agricultural machine, a cutter-carrying frame, a main frame, a slide to which said cutter-carrying frame is pivoted on a vertical axis, and means mounting said slide on said main frame for adjustment transversely of the path of the machine.

13. In an agricultural machine, an arched cutter-carrying frame, a frame bar over the crown of said arched frame and having a slot, a slide resting on said frame bar and extending across said slot, a pivot passing through said slot and connecting said crown bar with said slide, and means for connecting said bar and slide to normally hold the latter against sliding.

14. In an agricultural machine, a main frame, a plurality of arched cutter-carrying frames having their crowns pivoted to said main frame on vertical axes, said cutter-carrying frames each having a rigid arm, cutter-driving shafts extending between the lower ends of said arched frames and having ground wheels, connecting means connected with said arms, two vertically movable foot levers mounted on said main frame, and connections between said foot levers and said connecting means for moving the latter in one direction under the influence of one of said foot levers and vice versa.

15. In an agricultural machine, a frame, an implement-raising rock shaft thereon, an operating lever fixedly secured to said rock shaft, a second implement-raising lever loose upon said rock shaft near the first-named lever, a third lever loose upon said rock shaft between the first and second levers, said third lever having toothed segments, and dogs carried by the first and second levers and engaging said segments to normally lock the three levers together.

16. In an agricultural machine, a frame, an implement-raising rock shaft thereon, an operating lever fixedly secured to said rock shaft, a lateral implement-raising arm adjustable longitudinally of said rock shaft, a second implement-raising lever loose upon said rock shaft, said second lever being provided with a projection extending longitudinally of the shaft, a second lateral implement-raising arm adjustable longitudinally of said projection, a third lever loose upon said rock shaft, and means for locking the first and second levers to the third lever after any adjustment of said first and second levers, whereby operation of said third lever will operate the others in unison.

17. In an agricultural machine, a frame, two groups of parts thereon, each group comprising an implement-raising rock shaft having an operating lever, a second implement-raising lever loose upon said rock shaft, a third lever loose upon said rock shaft, and means for locking the first and second levers to the third lever after any adjustment of said first and second levers; a master control lever mounted on said frame, and operating connections between said master control lever and the third lever of both of said groups.

In testimony whereof we have hereunto affixed our signatures.

HENRY F. HILDEBRANDT.
ELLIS ALBAUGH.